(12) United States Patent
Mori et al.

(10) Patent No.: US 7,031,934 B2
(45) Date of Patent: Apr. 18, 2006

(54) ELECTRONIC COMMERCE SYSTEM AND METHOD FOR PROVIDING COMMERCIAL INFORMATION IN ELECTRONIC COMMERCE SYSTEM

(75) Inventors: Daisaku Mori, Yokohama (JP); Masafumi Okojima, Yokohama (JP); Akira Kumomura, Kawasaki (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/152,835

(22) Filed: May 23, 2002

(65) Prior Publication Data

US 2002/0133428 A1    Sep. 19, 2002

Related U.S. Application Data

(63) Continuation of application No. 09/519,746, filed on Mar. 6, 2000, now abandoned, which is a continuation of application No. 09/046,704, filed on Mar. 24, 1998, now Pat. No. 6,070,148.

(30) Foreign Application Priority Data

Mar. 25, 1997    (JP)    .................................. 9-071327

(51) Int. Cl.
    *G06F 17/60*    (2006.01)
(52) U.S. Cl. .......................................... 705/26; 705/41
(58) Field of Classification Search ................. 705/26, 705/27, 14, 41
    See application file for complete search history.

(56) References Cited

U.S. PATENT DOCUMENTS

| | | | | |
|---|---|---|---|---|
| 5,530,232 A | 6/1996 | Taylor | ......................... | 235/380 |
| 5,644,727 A | 7/1997 | Atkins | .......................... | 705/40 |
| 5,677,955 A | 10/1997 | Doggett et al. | ................ | 380/24 |
| 5,682,027 A | 10/1997 | Bertina et al. | ............... | 235/380 |

(Continued)

FOREIGN PATENT DOCUMENTS

JP    402001049 A    *    1/1990

OTHER PUBLICATIONS

"Smart Cards: Big Brother's Little helpers;" The Privacy Committee of new South Wales; No. 66; Aug. 1996.*

(Continued)

*Primary Examiner*—Jeffrey A. Smith
(74) *Attorney, Agent, or Firm*—Mattingly, Stanger, Malur & Brundidge, P.C.

(57) ABSTRACT

Log information concerning an electronic transaction performed between a transaction device and a business connection server through a network is compared with information concerning a predetermined business connection down-loaded from the server, and the log information is recorded in an IC card accepted by the transaction device when the log information is related to the information concerning a predetermined business connection. Predetermined commodity information is provided to a user in accordance with a request by the user of the IC card when the log information stored in the IC card satisfies a predetermined condition.

8 Claims, 13 Drawing Sheets

| 131 | 132 | 135 | 133 | 120 | |
|---|---|---|---|---|---|
| SETTLEMENT NO | SETTLEMENT METHOD | BUSINESS CONNECTION SENDING INFORMATION | AMOUNT OF SPENT MONEY | | |
| | | | PAST ONE MONTH | PAST THREE MONTHS | PAST SIX MONTHS |
| 1 | YOKOHAMACITY BANK | BANK ACCOUNT NO | 0.8 | 2.2 | 0.0 |
| 2 | DATA CASH | ELECTRONIC MONEY | 1.7 | 3.2 | 5.1 |
| 3 | QUARITY CASH | ELECTRONIC MONEY | 1.3 | 0.0 | 0.0 |
| 4 | CASH COMPANY | CHECK | 0.0 | 0.2 | 0.0 |
| 5 | VISTA CARD | CARD NO | 9.5 | 11.2 | 15.1 |
| ... | ... | ... | ... | ... | ... |

134

| 151 (101 OF FIG.9) | 152 | 153 (131 OF FIG.11) | | | | | 370 |
|---|---|---|---|---|---|---|---|
| COMMODITY NO | RECOMMENDED COMMODITY | SETTLEMENT NO (100$) | | | | | |
| | | 1 | 2 | 3 | 4 | 5 | ... |
| ... | ... | ... | ... | ... | ... | ... | ... |
| 7 | EXECUTIVE | 1~ | 2~ | 1~ | 3~ | 10~ | ... |
| | STANDARD | 0.5~1 | 1~2 | 0.5~1 | 1~3 | 5~10 | ... |
| | ECONOMY | ~1 | ~1 | ~0.5 | ~1 | ~5 | ... |
| ... | ... | ... | ... | ... | ... | ... | ... |

154

U.S. PATENT DOCUMENTS

| | | | |
|---|---|---|---|
| 5,705,798 A | 1/1998 | Tarbox | 235/379 |
| 5,739,512 A | 4/1998 | Tognazzini | 235/380 |
| 5,742,845 A | 4/1998 | Wagner | 710/11 |
| 5,753,899 A | 5/1998 | Gomm et al. | 235/381 |
| 5,825,881 A | 10/1998 | Colvin, Sr. | 705/26 |
| 5,845,267 A | 12/1998 | Ronen | 705/40 |
| 5,878,138 A | 3/1999 | Yacobi | 705/41 |
| 5,910,987 A | 6/1999 | Ginter et al. | 380/24 |
| 5,991,747 A | 11/1999 | Tomoyuki et al. | 705/41 |
| 6,012,049 A | 1/2000 | Kawan | 705/26 |
| 6,055,512 A | 4/2000 | Dean et al. | 705/26 |
| 6,070,148 A * | 5/2000 | Mori et al. | 705/26 |
| 6,202,054 B1 | 3/2001 | Lawlor | 705/26 |

OTHER PUBLICATIONS

"Insurance: Life Insurance Version", No. 3686, published by Insurance Research Institute Co., Ltd., Jan. 11, 1996, pp. 15-16.

"Nikkei Money", published by Nikkei Home Publishing Inc., Nov. 1, 1996, p. 59.

R. Clarke, "Chip-Based Payment Schemes: Stored Value Cards and Beyond;" Xamax Consultancy Pty Ltd., Sep. 1996.

* cited by examiner

FIG. 7

| TRANSACTION DEVICE CLASS | PASSWORD INPUT SCENE STORAGE ADDRESS | TRANSACTION MONITORING PROGRAM STORAGE ADDRESS |
|---|---|---|
| ATM | http//www.password.screen.NO1... | http://www.monitor.soft1... |
| PC | http//www.password.screen.NO2... | http://www.monitor.soft1... |
| PORTABLE TERMINAL | http//www.password.screen.NO3... | http://www.monitor.soft2... |
| TELEPHONE | http//www.password.screen.NO4... | http://www.monitor.soft3... |
| ... | ... | ... |

FIG. 8

| ADDRESS NO | MONITORED ADDRESS |
|---|---|
| a | http://www.nisancar.aaa/···.htm |
| b | http://www.yokhamacitybank.···/ |
| c | http://www.travelagency.ryokou.···.htm |
| d | http://www.xyzuniv.···.jp |
| e | http://www.hospital.···/ |
| ··· | ··· |

| COMMODITY NO 101 | INSURANCE CLASS 102 | COMMODITY CONTENT EXPLANATION ADDRESS 103 | ADVERTISEMENT 105 | | | | | | CONDITION 104 |
|---|---|---|---|---|---|---|---|---|---|
| | | | a | b | c | d | e | f 106 | |
| 1 | WHOLE LIFE | http://www.nippon.insurance.···.htm | 1 | 1 | | | | | ··· |
| 2 | OLD-AGE | | | 1 | | 1 | | | ··· |
| 3 | PENSION | http://www.HEISEILIFE.pension.···.htm | | 1 | | | | 1 | ··· |
| 4 | CANCER | http://www.SEIYOLIFE.cancer.···.htm | | | | | 1 | | ··· |
| 5 | ACCIDENT | http://www.SUMIDONMARINE.···/ | | | 1 | | 1 | | ··· |
| 6 | CAR | http://www.asiamarine.···.htm | | | 1 | 1 | | | ··· |
| 7 | TRAVEL | http://www.ABC.···.htm | | | | | | 2 | ··· |
| 8 | SKI | http://www.MITUWAMARINE.···/ | | | | 1 | | | ··· |
| 9 | GOLF | http://www.···.CO.JP | | | | | | | ··· |
| ··· | ··· | ··· | · | · | · | · | · | · | ··· |

FIG. 10

| COMMODITY NO 111 ((101 OF FIG.9)) | ADVERTISEMENT REJECT COUNT 112 | ADVERTISEMENT CONDITION (ACCESS HISTORY TO BUSINESS CONNECTION ADDRESS) 113 | | | | | | |
|---|---|---|---|---|---|---|---|---|
| | | a | b | c | d | e | f | ... |
| 1 | | 1 | | | | | | ... |
| 2 | | | | | 1 | | | ... |
| 3 | | | | | 1 | | 1 | ... |
| 4 | 1 | | | | | | | ... |
| 5 | 1 | | | | | 1 | | ... |
| 6 | | | | | | 1 | | ... |
| 7 | | | | 1 | | | | ... |
| 8 | | | | 1 | | | | ... |
| 9 | | | | | | | | ... |
| ... | ... | ... | ... | ... | ... | ... | ... | ... |

| 131 | 132 | 135 | 133 | |
|---|---|---|---|---|
| | | | AMOUNT OF SPENT MONEY 120 | |
| SETTLEMENT NO | SETTLEMENT METHOD | BUSINESS CONNECTION SENDING INFORMATION | PAST ONE MONTH | PAST THREE MONTHS | PAST SIX MONTHS |
| 1 | YOKOHAMACITY BANK | BANK ACCOUNT NO | 0.8 | 2.2 | 0.0 |
| 2 | DATA CASH | ELECTRONIC MONEY | 1.7 | 3.2 | 5.1 |
| 3 | QUARITY CASH | ELECTRONIC MONEY | 1.3 | 0.0 | 0.0 |
| 4 | CASH COMPANY | CHECK | 0.0 | 0.2 | 0.0 |
| 5 | VISTA CARD | CARD NO | 9.5 | 11.2 | 15.1 |
| ... | ... | ... | ... | ... | ... |

| COMMODITY NO 151 (101 OF FIG.9) | RECOMMENDED COMMODITY 152 | SETTLEMENT NO (100 $) 153 (131 OF FIG.11) 370 | | | | | |
|---|---|---|---|---|---|---|---|
| | | 1 | 2 | 3 | 4 | 5 | ... |
| ... | ... | ... | ... | ... | ... | ... | ... |
| 7 | EXECUTIVE | 1~ | 2~ | 1~ | 3~ | 10~ | ... |
| | STANDARD | 0.5~1 | 1~2 | 0.5~1 | 1~3 | 5~10 | ... |
| | ECONOMY | ~1 | ~1 | ~0.5 | ~1 | ~5 | ... |
| ... | ... | ... | ... | ... | ... | ... | ... |

154

ELECTRONIC COMMERCE SYSTEM AND METHOD FOR PROVIDING COMMERCIAL INFORMATION IN ELECTRONIC COMMERCE SYSTEM

This is a continuation of application Ser. No. 09/519,746, filed Mar. 6, 2000; which is a continuation of Ser. No. 09/046,704, filed Mar. 24, 1998, now U.S. Pat. No. 6,070, 148.

BACKGROUND OF THE INVENTION

The present invention relates to an electronic commerce system and handling of information in the electronic commerce system, and particularly to a suitable electronic commerce system using a combination of a transaction device and a portable information recording medium such as an IC card, or the like, to perform a commercial transaction and a method for providing commodity (item) information in the electronic commerce system.

At present, with respect to an insurance commodity which is one of commodities such as monetary commodities, it is general that a salesman suggests an insurance commodity to a customer uniformly by intuition and experience of the salesman. In the sales action, customer information (name, address, event, life cycle, etc.) is first collected by means of conversation, questionnairing, or the like. The collected customer information is inputted into a terminal in an insurance company to thereby generate an insurance plan. The salesman proposes an insurance commodity while explaining the contents of the plan generated correspondingly to the schedule of meeting the customer.

In an instance described on pages 15 to 16 in "Insurance: Life-insurance Version", No. 3686, published by Insurance Research Institute Co., Ltd. on Jan. 11, 1996, a salesman is made to carry a terminal which is a combination of a portable telephone and a notebook type personal computer so that the salesman can perform, on site, both inputting of customer information and generation of an insurance plan. In an instance described on page 59 of "NIKKEI MONEY" published by Nikkei Home Publishing Inc. on Nov. 1, 1996, a customer per se can send personal information such as address, name, date of birth, policy number, content of consultation, etc. by electronic mail so that the customer can receive service of consultation of an insurance and generation of an insurance plan. Incidentally, in an agency, an insurance commodity is proposed in the timing of sailing of a commodity as an occupation so that the proposal can be connected to a contract.

SUMMARY OF THE INVENTION

The aforementioned conventional procedure has the following problem. That is, it is rare that the customer per se recognizes the necessity of an insurance commodity because of the characteristic of the insurance commodity, and the provision of incentive is therefore on the part of the insurance company. Therefore, face-to-face sale through a channel (salesman, agency, etc.) corresponding to the characteristic of the commodity is fundamental. Further, because commission on sale varies correspondingly to the commodity, the sale of a commodity having a higher commission is apt to be emphasized in the face-to-face sale. Furthermore, because the means of collecting customer information such as consuming action, life cycle, etc. in the insurance company is limited to means of conversation, questionnairing, etc., proposal is not made in suitable timing. Further, because channels having comprehensive skill both in sale of life insurance and in sale of nonlife insurance are in short supply, comprehensive insurance planning corresponding to the characteristic of a customer segment is little made. In addition, because preparation of infrastructure such as network, or the like, is retarded, there are a few of effective insurance sale aiding methods using the infrastructure.

As described above, in the conventional system, one-way proposal of a commodity or service (insurance) was performed from the part of a business connection (insurance company), so that a customer (user) could not recognize the necessity and interest of the commodity (insurance) in suitable timing.

On the other hand, as a conventional electronic commerce system in which a user attaches his or her IC card into a transaction device so that a commercial transaction is made between the transaction device and a business connection server through a network, there is a system in which, when the user makes a commercial transaction on a certain commodity (for example, travel) between a transaction terminal and a business connection concerning the commodity (for example, travel agency), log information, or the like, concerning the commercial transaction is stored in a server in the business connection (travel agency) so that information concerning a certain commodity or service (for example, insurance) is provided to a user when the log information, or the like, satisfies a predetermined condition. In such a system, the log information, or the like, is kept and stored in the business connection server (server in the travel agency). In the case of another commodity (for example, car) not dealt in by the travel agency, the user makes a commercial transaction with a business connection (car dealer) concerning the commodity and log information, or the like, concerning the transaction of the car is stored in a server in the car dealer. Assuming now that the log information, or the like, is not shared to the servers in the travel agency and the car dealer, then the server in the car dealer provides information concerning the commodity and service to the user merely on the basis of the log information, or the like, concerning the transaction of the car. In this case, information concerning a suitable commodity or service on the basis of all log information, or the like, accumulated with respect to the user in the past cannot be provided to the user.

Further, because log information, or the like, accumulated with respect to the user is stored in the server, there is a risk of leaking of information concerning the privacy of the user.

An object of the present invention is to provide an electronic commerce system in which a customer per se can acquire information concerning a commodity or service in suitable timing, and a method for providing commodity information in the electronic commerce system.

Another object of the present invention is to provide an electronic commerce system in which information concerning a suitable commodity or service can be provided to a user in suitable timing on the basis of log information, or the like, in commercial transactions even in the case where the user makes commercial transactions between a transaction device and a plurality of business connection servers to which the log information, or the like, is not shared, and a method for providing commodity information in the electronic commerce system.

A further object of the present invention is to provide an electronic commerce system in which information concerning the privacy of a user such as log information, or the like, concerning electronic commerce on a network can be prevented from leaking, and a method for providing commodity information in the electronic commerce system.

To achieve the foregoing objects, the present invention is designed so that log information, or the like, concerning electronic commerce on a network is collected in a user's own portable information recording medium so that information concerning a suitable commodity or service is provided to the user on the basis of the log information, or the like, collected in the user's own portable information recording medium.

That is, according to an aspect of the present invention, in an electronic commerce system having a transaction device, a business connection server for performing a transaction with said transaction device, and a network for connecting said transaction device to said business connection server so that a commercial transaction is performed between said transaction device and said business connection server through said network, there is provided an information providing method for providing information concerning a predetermined commodity to a user operating said transaction device, said method comprising the steps of: (a) making said transaction device accept a portable information recording medium possessed by the user operating said transaction device; (b) obtaining information concerning a business connection in a transaction between said transaction device and said business connection server through said network; (c) determining whether the information concerning the business connection obtained in the step (b) is set as business connection monitoring information prepared in advance or not; (d) obtaining history of information concerning transaction with respect to a business connection performed between said transaction device and said business connection and recording the obtained history into said portable information recording medium when the step (c) makes a determination that the information concerning the business connection obtained in the step (b) is set as business connection monitoring information prepared in advance; (e) determining whether the history of information concerning the transaction with respect to the business connection recorded in said portable information recording medium satisfies a predetermined condition; and (f) providing information concerning said predetermined commodity when the step (e) makes a determination that the history of information concerning the transaction with respect to the business connection satisfies the predetermined condition.

According to an example of the present invention, in the above step (c), an address of a predetermined business connection is set as said business connection monitoring information.

According to an example of the present invention, in the transaction device, said step (a) includes: a substep of obtaining, from said portable information recording medium, a server address of a server held by said portable information recording medium and connected to said network; and a substep of obtaining at least one of a monitoring program, said business connection monitoring information, and said predetermined condition for executing said steps (c) through (f), from said server specified by said obtained server address through said network.

Thus, according to the present invention, log information, or the like, concerning electronic commerce on a network is collected in a user's own portable information recording medium so that information concerning a commodity or service is provided to the user on the basis of the log information, or the like, collected in the user's own portable information recording medium. Accordingly, it is possible to provide information concerning a suitable commodity or service to the user in suitable timing.

Further, log information, or the like, concerning electric commerce on a network is collected not into a server such as a business connection server but into a user's own portable information recording medium possessed by the user. Accordingly, it is possible to provide information concerning a suitable commodity or service to a user in suitable timing on the basis of the log information, or the like, in commercial transactions with a plurality of business connection servers even in the case where the user makes commercial transactions between a transaction device and the plurality of business connection servers which do not share the log information, or the like, with each other.

Further, it is possible to prevent information concerning the privacy of a user such as log information, or the like, concerning electronic commerce on a network from leaking.

According to an example of the present invention, the above step (f) includes a substep of dividing a display scence of said transaction device indicating a state of transaction into a plurality of regions so as to display the information concerning said predetermined commodity in one of said plurality of regions of said divided display scence.

According to another example of the present invention, the above step (f) includes a substep of dividing a display scence of said transaction device indicating a state of transaction into a plurality of regions so as to display information from said business connection server in one of said plurality of regions of said divided display scence and to display information from another business connection server which is different from said first-mentioned business connection server and connected to said network in another one of said plurality of regions.

Further, extremely advantageously for the user, it is possible to display information of commodities from a plurality of business connection servers which do not share the log information, or the like, in divisional scences on the display unit of the transaction device.

BRIEF DESCRIPTION OF THE DRAWINGS

FIG. 7 is a view showing an example of data configuration on a display scence address table;

FIG. 8 is a view showing an example of data configuration on a monitored address table;

FIG. 9 is a view showing an example of data configuration on an insurance advertisement condition table;

FIG. 10 is a view showing an example of data configuration in a business connection address history storage portion;

FIG. 11 is a view showing an example of data configuration in a settlement transaction account storage portion 120;

FIG. 12 is a view showing an example of data configuration on a commodity scence display condition table 370;

DESCRIPTION OF THE PREFERRED EMBODIMENTS

Embodiments of an electronic commerce system according to the present invention will be described below with reference to the drawings.

Figure 1:
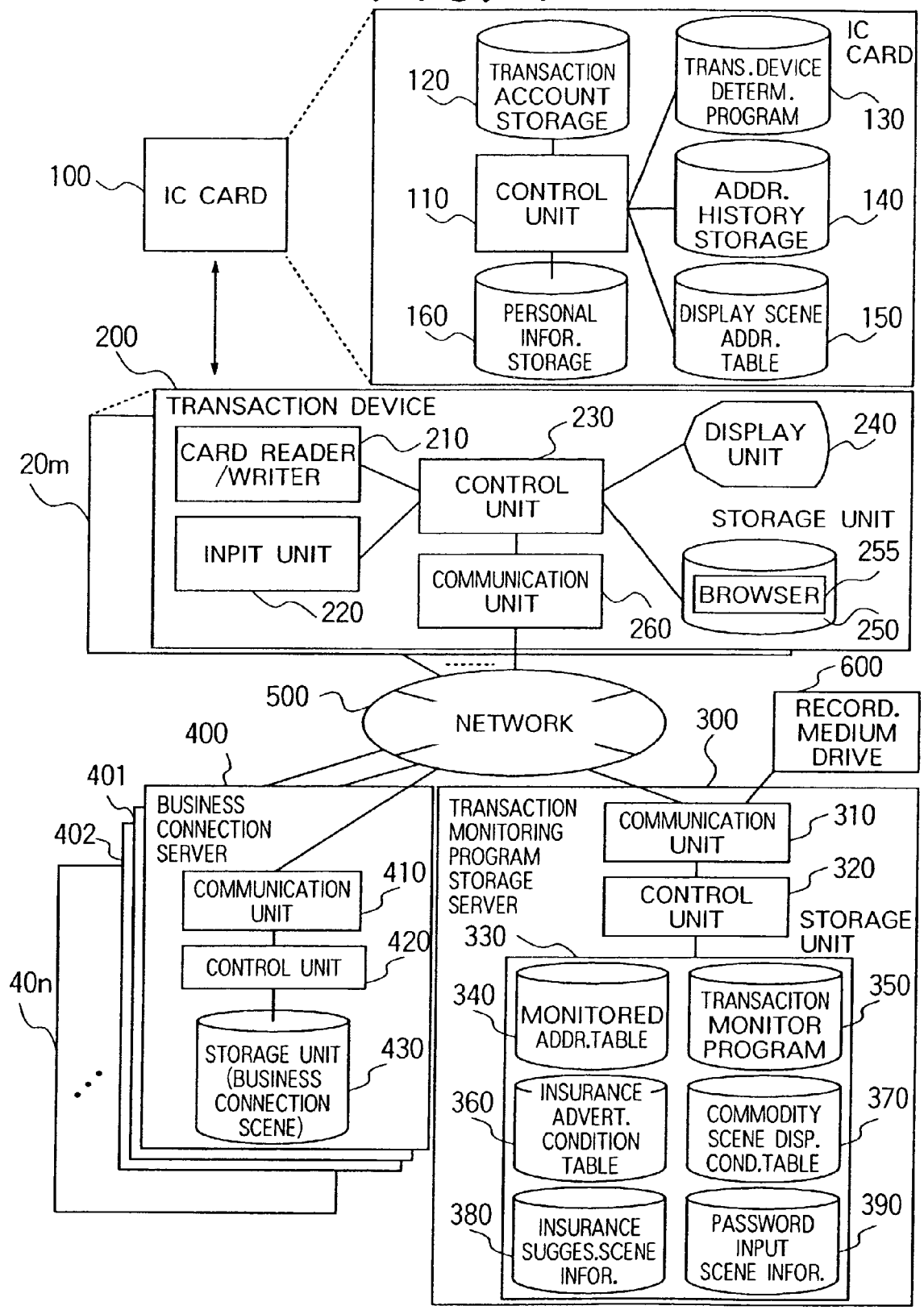
FIG. 1 is a block diagram showing the configuration of an embodiment of a system according to the present invention.

FIG. 1 is a block diagram showing an example of configuration of an embodiment of an electronic commerce system according to the present invention. In FIG. 1, the reference numeral 100 designates an IC card which is a portable recording medium possessed by a user for use for performing various transactions and information collection, in other ward, which is a card type information recording medium such as a credit card, a cash card, or the like, having a CPU and a memory. The reference numerals 200 to 20m designate transaction devices each of which is a terminal equipment operated together with the IC card 100 by the user. The reference numerals 400 to 40n designate business connection servers each of which is disposed in a business connection where the user transacts or collects information through the transaction device 200. The reference numeral 300 designates a transaction monitoring program storage server which holds a program necessary for monitoring transactions in this system. The reference numeral 500 designates a network by which the transaction devices 200 to 20m, the transaction monitoring program storage server 300 and the business connection servers 400 to 40n are connected. Although this embodiment shows the case where internet is used as the network 500, the invention may be applied to the case where a private network or a public telephone line network is used as the network 500.

As shown in FIG. 1, the transaction device 200 and at least one of the transaction devices 201, 202 to 20m having the same configuration as the transaction device 200 and connected to the network 500 are provided in this embodiment. Further, the business connection server 400 and at least one of the business connection servers 401, 402 to 40n having the same configuration as the business connection server 400 and connected to the network 500 are provided in this embodiment. The business connection servers are provided in the respective business connections so that one business connection server corresponding to one business connection may be operated or one business connection server corresponding to a plurality of business connections may be operated. Although this embodiment shows the case where only one transaction monitoring program storage server 300 is provided, the invention may be applied to the case where a plurality of transaction monitoring program storage servers are provided. In the following, the case where only one transaction monitoring program storage server is provided is described for simplification of description. Further, in the following, the case where a commercial transaction is performed between the transaction device 200 and the business connection server 400 is described.

Incidentally, the present invention can be applied to a system having one transaction device, and one business connection server.

Although this embodiment shows the case where a transaction of a commodity, that is, electronic commerce is performed between a transaction device and a business connection server, the system according to the present invention may be applied not only to the case of the commodity transaction but also to the case of information exchange or information collection concerning a commodity, or the like, between a transaction device as a terminal equipment and a business connection server as a server.

An IC card 100 includes a control unit 110 for performing control to achieve various functions such as taking data out of a transaction device, for example, the transaction device 200 in which the control unit 110 is inserted, recording data, checking, or the like. In practice, the control unit 110 is achieved as a processor incorporated in an IC chip mounted on the IC card 100 so that these functions are achieved in accordance with programs stored in a memory on the IC chip. The IC card 100 further includes a settlement transaction account storage portion 120 for recording settlement transaction accounts, a transaction device determination program storage portion 130 for storing a transaction device determination program for judging the transaction device, a business connection address history storage portion 140 for recording the history of addresses of business connections with which transactions are made, a display scence address storage portion 150 for recording addresses of display scences displayed in the transaction terminal 200, and a personal information storage portion 160 for recording information such as personal information, or the like. These storage portions are provided in a semiconductor storage device which is built in the IC card 100.

Each of the transaction devices 200 to 20m includes a control unit 230, a card reader/writer 210, an input unit 220, a display unit 240, and a storage unit 250. The control unit 230 controls the operation of peripheral equipment included in a corresponding transaction device in accordance with a program stored in the inside of the control unit 230. When the IC card 100 is inserted in the card reader/writer 210, the card reader/writer 210 makes data exchange between the card reader/writer 210 and a control portion of the IC card 100 inserted in the card reader/writer 210 to thereby record data in the IC card 100 or read data recorded in the IC card. The input unit 220 is used as means for making a user input data such as code number, or the like. The display unit 240 indicates scence information, or the like, down-loaded from the server 300, 400–40n connected to the network. A browser 255 which is a program for down-loading scence information, or the like, from the server 300, 400–40n connected to the network 500 and indicating the scence information on the display unit 240 is stored in the storage unit 250. The control unit 230 operates the browser 255 stored in the storage unit to thereby down-load scence information, or the like, from the server 300, 400–40n and indicate the scence information on the display unit 240. The reference numeral 260 designates a communication unit which makes communication between each constituent element in the transaction device 200 and the server 300, 400–40n through the network 500.

The transaction monitoring program storage server 300 includes a control unit 320, a communication unit 310, and a storage unit 330. The control unit 320 achieves various functions of the transaction monitoring program storage server 300 in accordance with a program stored in the control unit 320. The communication unit 310 controls communication between the server 300 and the transaction device 200–20m through the network 500. The storage unit 330 stores a monitored address table 340, a transaction monitoring program 350, a commodity information providing condition table (insurance advertisement condition table) 360, a commodity scence display condition table 370, commodity suggestion scence information (insurance suggestion scence information) 380, and password input scence information 390.

Each of the business connection servers 400–40n includes a control unit 420, a communication unit 410, and a storage unit 430. The control unit 420 achieves various functions of a corresponding business connection server in accordance with a program stored in the control unit 420. The communication unit 410 controls communication between the business connection server 400 and the transaction device 200–20m through the network 500. The storage unit 430 stores business connection scence information necessary for achieving a transaction between the transaction device 200 and the business connection. The business connection server 400 may be used commonly to a plurality of business connections or the business connection server 400 may be provided so as to correspond to one business connection. In the latter case, a plurality of business connection servers 400–40n are connected to the network 500 as shown in FIG. 1. Each of the business connection servers 401–40n has substantially the same configuration as the business connection server 400.

Figure 2:
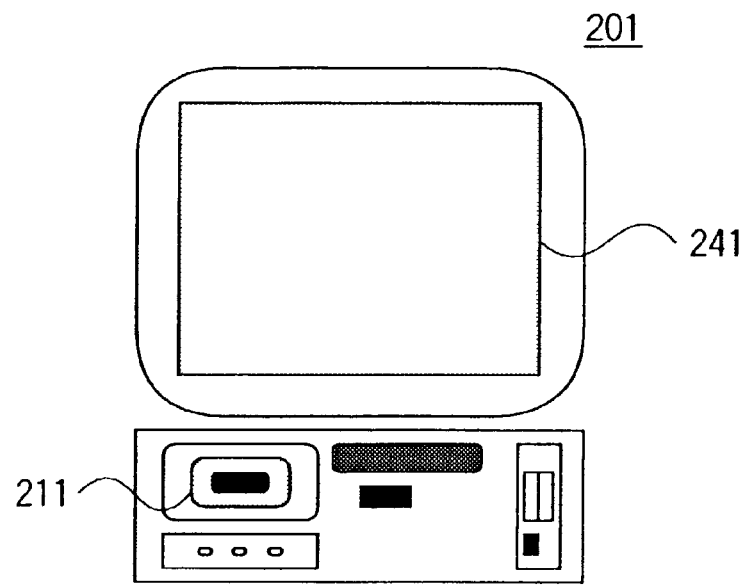
FIG. 2 is an external appearance view of a personal computer which can be used as a transaction device.

FIG. 2 is an external appearance view of a personal computer 201 which can be used as an example of the transaction device in this embodiment. The personal computer 201 used in this embodiment has a card reader/writer 211 which is an interface for the IC card 100. Various types of scence information down-loaded from the transaction monitoring program storage server 300 or the business connection server 400 are indicated on the display unit 241. The personal computer 201 further has a keyboard or a pointing device such as a mouse, or the like, as the input device 220 though the input device is not shown in FIG. 2.

Figure 3:
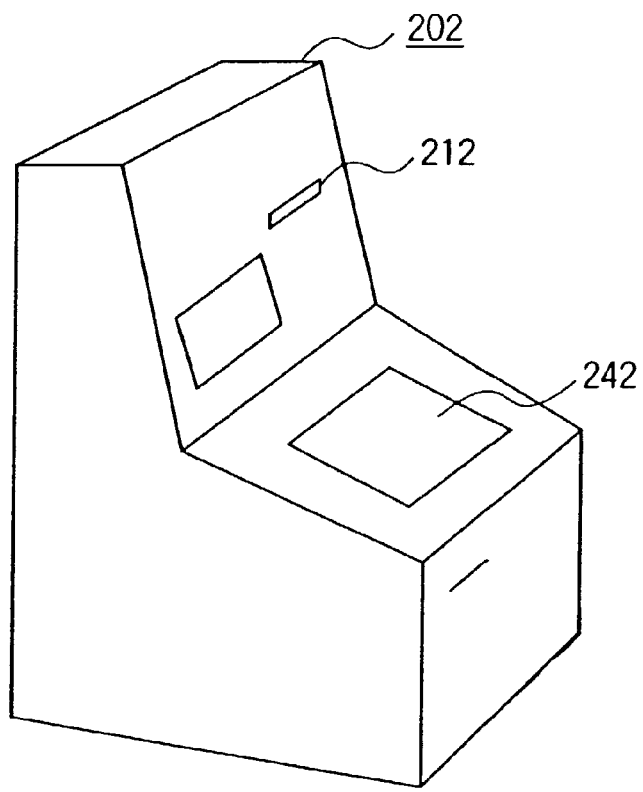
FIG. 3 is an external appearance view of an ATM which can be used as a transaction device.

FIG. 3 is an external appearance view of an ATM 202 which can be used as another example of the transaction device. The ATM 202 is mainly disposed in a financial institution such as a bank, or the like. Also the ATM 202 has an IC card reader/writer 212. The reference numeral 242 designates a touch panel for displaying various types of guidance and performing input operations. The touch panel 242 serves as the display unit 240 in FIG. 1 and also as the input unit 220 in FIG. 1.

Figure 4:
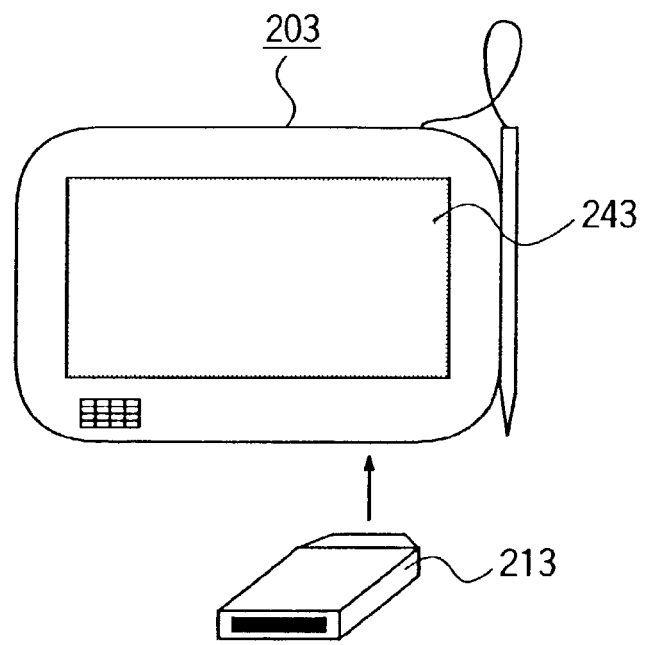
FIG. 4 is an external appearance view of a portable terminal equipment which can be used as a transaction device.

FIG. 4 is an external appearance view of a portable terminal equipment 203 as a further device which can be used as a further example of the transaction device. The portable terminal equipment 203 has a panel 243 which serves as the input unit 220 in FIG. 1 and also as the display unit 240 in FIG. 1. Further, an IC card reader/writer 213 for performing data exchange between the portable terminal equipment 203 and the IC card 100 can be attached to the portable terminal equipment 203.

Figure 5:
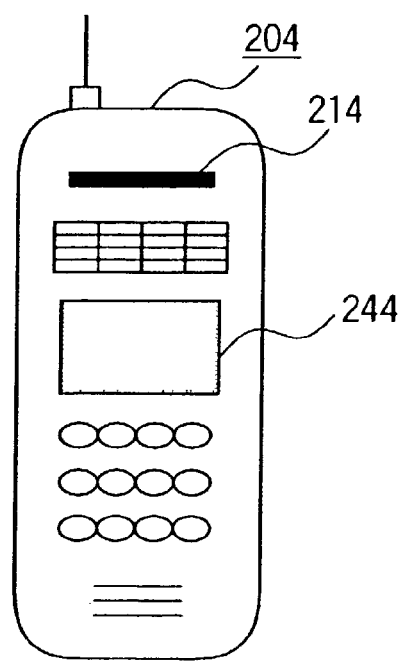
FIG. 5 is an external appearance view of a telephone which can be used as a transaction device.

FIG. 5 is an external appearance view of a telephone 204 which can be used as a still further example of the transaction device. The telephone 204 has a display panel 244 for displaying information down-loaded through the network 500, and an IC card reader/writer 214.

Figure 6:
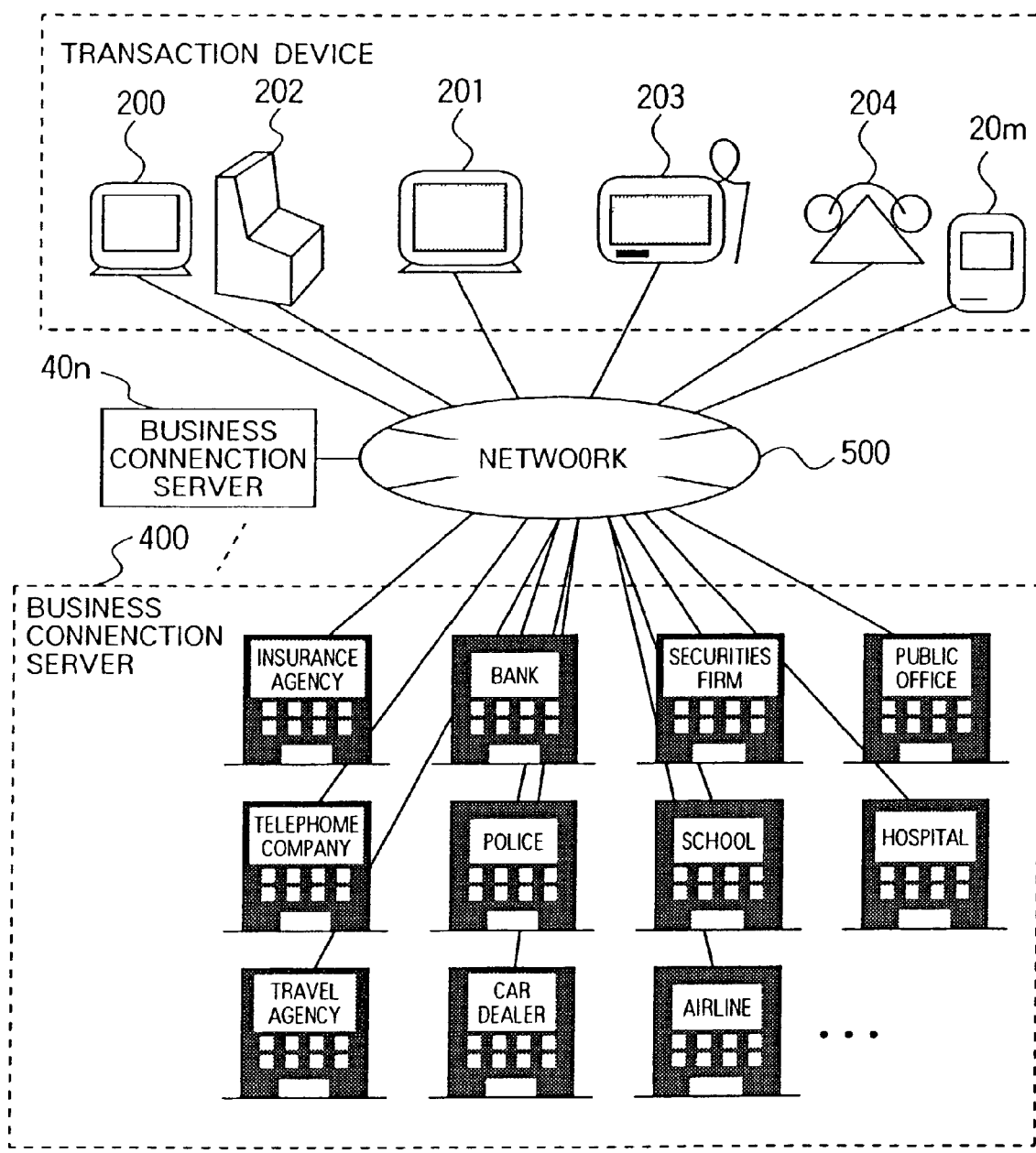
FIG. 6 is a conceptual view of an example of a real system in which various types of transaction devices are connected to various types of business connection servers by a network.

FIG. 6 is a conceptual view showing an example of a real system in which various transaction devices 200–20m and various business connection servers 400–40n are connected through the network. A user uses a transaction device such as an ATM 202, a personal computer 201, a portable terminal 203, a telephone 204, or the like, to perform electronic commerce with a business connection connected to the internet (network 500). The electronic commerce used herein means a commodity transaction which is performed between the transaction device 200–20m and the business connection server 400–40n in FIG. 1 while electronic information is exchanged through the network 500. Various companies and groups such as insurance companies, travel agencies, banks, etc. can form the business connections. The business connection server 400 in FIG. 6 is operated by these business connections.

In FIG. 6, for example, one mall is provided in the business connection server 400. The mall is operated by the plurality of business connections. Incidentally, the business connections in the business connection server 400 may be configured so that one business connection server is provided so as to correspond to one business connection and that business connection servers are operated by corresponding business connections respectively.

FIG. 7 is a view of an example of data configuration of the display scence address table 150 stored in the IC card 100. The display scence address table 150 has a transaction device class column 81 for registering at least one transaction device class, a password input scence storage address column 82 corresponding to the device class column 81, and a transaction monitoring program storage address column 84.

Assume now that the password input scence displayed on the display unit of the transaction device to make a user input a password varies correspondingly to the class of the transaction device. Accordingly, an address in which password input scence information corresponding to the class of a transaction device registered in the transaction device class column 81 is stored is registered in the password input scence storage address column 82. Similarly, the transaction monitoring program which is operated on the transaction device for monitoring the address of a business connection for a transaction between the transaction device and the business connection varies correspondingly to the class of the transaction device. Accordingly, an address in which a transaction monitoring program allowed to be operated on the transaction device is stored correspondingly to the class of a transaction device registered in the transaction device class column 81 is registered in the transaction monitoring program storage address column 84. Here, a uniform resource locator (URL) is used as the address.

Although the description has been made about the case where classes such as ATM, PC (personal computer), portable terminal, telephone, etc. are used as classes of the transaction devices, the invention may be applied to the case where PC is further classified into WINDOWS, SYSTEM7, MS-DOS, etc. as OS (operating system) classes.

FIG. 8 is a view of an example of data configuration of the monitored address table 340 stored in the transaction monitoring program storage server 300. The monitored address table 340 is a table for managing, as monitored addresses, the addresses of business connections allowed to be accessed (connected) by the transaction devices 200–20m through the network 500, especially, the addresses of business connections having deep relations with a commodity (for example, insurance) whose information will be provided to the user. The monitored address table 340 has an address No. column 91, and a monitored address column 92. The address (for example, URL) of a business connection in which a transaction is monitored is registered in the monitored address column 92. Identifiers (for example, a, b, c, d, e, etc.) for identifying the addresses of business connections registered in the monitored address column 92 are set in the address No. column 91. Accordingly, the identifiers in the address No. column 91 correspond to the business connections.

FIG. 9 is a view of an example of data configuration of the insurance advertisement condition table 360 which is a table for defining conditions to provide commodity information (for example, insurance information) stored in the transaction monitoring program storage server 300. Addresses of destinations for storing commodity explanation scences for explaining the contents of various insurances as commodity information to be provided and information for managing conditions for displaying the commodity explanation scences in the transaction device 200 are registered in the insurance advertisement condition table 360. Specifically, the insurance advertisement condition table 360 has a commodity No. column 101, an insurance class column 102, a commodity content explanation address column 103, and an advertisement condition column 104. Numbers as identifiers for identifying insurance commodities respectively are registered in the commodity No. column 101. Information for indicating the classes of insurance commodities identified by the identifiers registered in the commodity No. column 101 is set in the insurance class column 102. Further, addresses (for example, URL) of destinations for storing explanation scences for explaining the contents of the commodities are registered in the commodity content explanation address column 103. The advertisement condition column 104 has entries corresponding to the identifiers (for example, a, b, c, d, e, f, etc.), that is, corresponding to the business connections, registered in the address No. column 91 of the business connection address table 340. Conditions for explaining the commodities are set on the basis of information registered in the entries correspondingly to the insurance classes in the insurance class column 102. In this embodiment, the condition and timing for explaining the commodities are determined on the basis of the respective numbers of times of access to the various business connections. Accordingly, the number of times by which an address of a business connection corresponding to each entry in the advertisement condition column 104 is accessed is set in the entry of the advertisement condition column 104 as a condition for displaying, in the transaction device 200, the scence information stored in a destination indicated by the address registered in the commodity content explanation address column 103. For example, with respect to the commodity No. 7 (travel insurance), a scence for explaining travel insurance is displayed in the transaction device 200 when the address of a business connection identified by the address No. c on the business connection address table 340 is accessed once on the basis of a record 105 so that the advertisement condition is satisfied.

FIG. 10 is a view of an example of data configuration of the business connection address history storage portion 140 stored in the IC card 100. The history, or the like, of access to business connections managed on the basis of the monitored address table 340 is stored in the business connection address history storage portion 140. The business connection address history storage portion 140 has a commodity No. column 111 (corresponding to the column 101 in FIG. 9), an advertisement reject count column 112, and an advertisement condition column (address access history column) 113. Numbers for identifying commodities as subjects of advertisement are registered in the commodity No. column 111 correspondingly to the commodity No. column 101 on the insurance advertisement condition table 360. The histories (the number of times) of access to business connections as subjects of monitoring of transactions are recorded in the advertisement condition column 113. The advertisement condition column 113 has entries corresponding to business connections as subjects of monitoring of transactions. The number of times in access to a business connection corresponding to each commodity No. (commodity (insurance) class) in the commodity No. column 111 is accumulatively recorded in the entry of the business connection. Further, the number of times by which the user rejects the explanation of a commodity identified by the commodity No. registered in the corresponding commodity No. column 111 though the advertisement condition is validated so that the explanation of the commodity is performed on the scence of the transaction device 200 is set in the advertisement reject count column 112.

For example, with respect to the commodity No. 1, the advertisement condition column 113 indicates that access to business connections identified by "a" and "d" in the advertisement condition column 113 is performed once respectively. On the other hand, the advertisement condition column 104 in FIG. 9 indicates that the condition for advertising the commodity No. 1 is satisfied when access to business connections identified by "a", "b" and "d" is performed once respectively. Accordingly, in the present state shown in FIG. 10, the condition for advertising the commodity No. 1 is not satisfied, so that the explanation of the commodity has been not performed on the scence of the transaction device 200 yet.

FIG. 11 is a view of an example of data configuration of the settlement transaction account storage portion 120 stored in the IC card 100. The settlement transaction account storage portion 120 accumulatively manages amounts of money settled or spent in transactions between the user and business connections correspondingly to settlement methods used for the transactions. The settlement transaction account storage portion 120 has a settlement No. column 131, a settlement method column 132, a business connection sending information column 135, and a spent money column 133. The class of settlement between the user and the business connection (company name such as bank name, credit company name, etc., which has performed settlement) is registered in the settlement method column 132. A number given conveniently for identifying each settlement method registered in the settlement method column 132 is registered in the settlement No. column 131. Business connection sending information registered in the business connection sending information column 135 is information used in the settlement method registered in the settlement method column 132 and indicating the class of information regarded as a monetary symbol. The spent money column 133 is partitioned into predetermined terms so that accumulated amounts of money spent in the respective terms are registered correspondingly to the class of the settlement. In FIG. 11, the spent money column 133 is partitioned into a term of from the present to the past one month, a term of from the past three months to the past one month and a term of from the past six months to the past three months.

FIG. 12 is a view of an example of data configuration of the commodity scence display condition table 370 stored in the transaction monitoring program storage server 300. The commodity scence display condition table 370 manages a condition for judging the type of a commodity recommended to the user on the basis of the transaction accounts in commerce between the user and the business connection server. The commodity scence display condition table 370 has a commodity No. column 151 (corresponding to the column 101 in FIG. 9), a recommended commodity column 152, and a settlement No. column 153 (corresponding to the column 131 in FIG. 11). Numbers for identifying commodities (corresponding to the numbers in the commodity No. column in FIG. 9) are registered in the commodity No. column 151. The recommended commodity column 152 has one entry or a plurality of entries for the types of commodities (insurances) corresponding to the numbers in the commodity No. column 151. The types of the commodities (insurances) are registered in the entries. Further, the settlement No. column 153 is partitioned into one or a plurality of groups corresponding to the settlement numbers (corresponding to the settlement methods) registered in the settlement No. column 131 of the settlement transaction account storage portion 120. Amounts of spent money as a condition necessary for determining the type of the commodity registered in the recommended commodity column 152 are set in the settlement No. column 153 so as to be categorized by the settlement methods used.

In the settlement method column 132 in FIG. 11, the settlement methods indicated by the settlement No. 1, No. 2, No. 3, No. 4 and No. 5 are, for example, settlement by bank, settlement by electronic money, settlement by electronic money, settlement by check, and settlement by credit card issued by a credit card company, respectively.

In FIG. 12, for example, with respect to a travel insurance identified by the commodity No. 7 in the commodity No. column 151, the recommended commodity type is determined as follows. If the amount of memory settled by bank as the settlement method indicated by the settlement No. 1 in the settlement No. column 153 is not smaller than 100 dollars, an executive type is recommended as the recommended commodity (travel insurance) type. If the amount of memory is in a range of from 50 to 100 dollars, a standard type is recommended. If the amount of memory is not larger than 50 dollars, an economy type is recommended.

Figure 13:
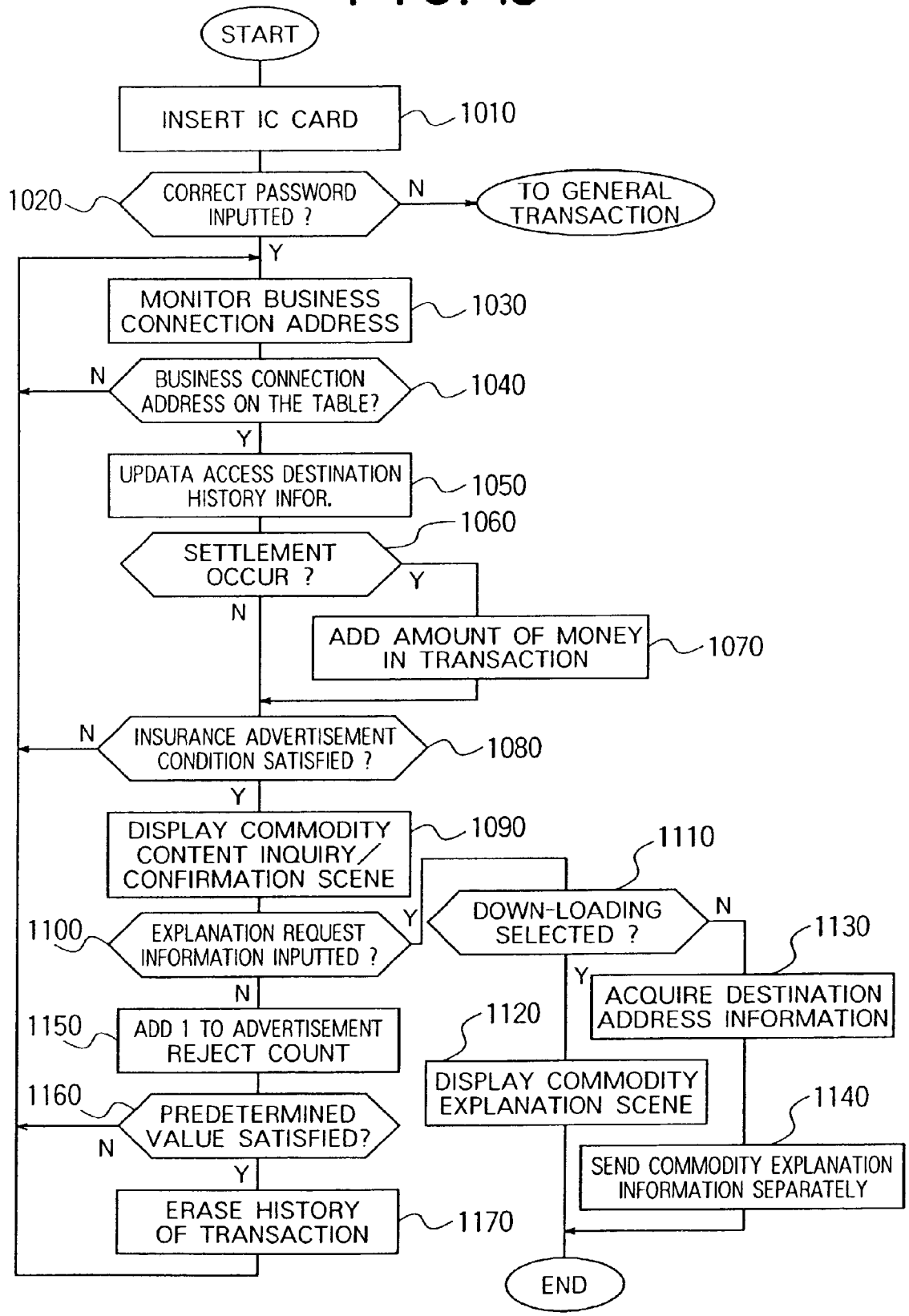
FIG. 13 is a flow chart showing a procedure for suggesting a commodity to a user.

FIG. 13 is a flow chart showing a procedure for suggesting a commodity to a user in this embodiment. The operations of respective portions will be described below with reference to this flow chart. Incidentally, in the following description, the case where a transaction device 200 (personal computer) is used for performing a commercial transaction (of an insurance) between the transaction device 200 and a business connection server 400 is taken as an example. The procedure in FIG. 13 is carried out on the basis of a program stored in a memory in the control unit 230.

First, when the user inserts the IC card 100 in the IC card reader/writer 210 of the transaction device 200 in order to perform a transaction, the control unit 230 controls the card reader/writer 210 to read a transaction device determination program 130 from the IC card 100 inserted in the IC card reader/writer 210. In this occasion, the control unit 230 executes the thus read transaction device determination program 130 and then executes the steps 1010 and 1020 which will be described below. That is, the control unit 230 acquires information for judging the class of the transaction device 200 and then delivers the thus acquired information to the control unit 110 of the IC card 100 through the card reader/writer 210. The control unit 110 determines the device class of the transaction device 200 on the basis of the thus received information. After recognizing the device class of the transaction device 200, the control unit 110 acquires a record having the device class registered in the device class column 81 by reference to the display scence address table 150 (FIG. 7) of the IC card 100. An address set in the password input scence storage address column 82 in the thus acquired record is delivered to the control unit 230 through the card reader/writer 210. Because the transaction device 200 is a personal computer in this embodiment, the control unit 110 selects a record 83 and delivers an address set in the password input sscence storage address column 82 in the record 83 to the control unit 230 (step 1010).

The control unit 230 executes the browser 255, downloads a password input scence from insurance suggestion scence information 380 in the transaction monitoring program storage server 300 on the basis of the address received from the IC card 100 and displays the scence on the display unit 240. Incidentally, in a transaction device such as a telephone, or the like, having no display unit 240, the same procedure as described above can be carried out by use of an answering function, or the like. When the user operates the input unit 220 and inputs a password in the password input scence, the control unit 230 encodes the inputted password and delivers the encoded password to the IC card 100 through the card reader/writer 210. The control unit 110 of the IC card 100 decodes the received password and determines whether the password is coincident with the password set in the IC card in advance or not, that is, whether the inputted password is correct or not (step 1020). Although the password is encoded and transmitted between the IC card 100 and the transaction device 200 for the purpose of preventing information from leaking, or the like, the same processing as described above is executed also for data exchange between the IC card 100 and the transaction device 200 after that.

If the result of the determination in the step 1020 proves that the inputted password is incorrect, the same general transaction as in the conventional system is performed between the transaction device 200 and the business connection server 300 without the following procedure. In this case, the procedure after that is substantially not different from the conventionally known procedure. Accordingly, the description of the procedure after that will be omitted.

If the result of the determination in the step 1020 proves that the inputted password is correct, the result of the determination is notified to the IC card 100. Upon reception of the notification, the control unit 110 of the IC card 100 delivers an address set in the transaction monitoring program storage address column 84 in the record 83 on the display scence address table 150 (FIG. 7) acquired in the step 1010 to the transaction device 200. Using the address received through the browser 255, the control unit 230 down-loads the monitored address table 340 (FIG. 8), the transaction monitoring program 350 and the insurance advertisement condition table 360 (FIG. 9) from the transaction monitoring program storage server 300 corresponding to the address and monitors the user's electronic commerce which will-be performed by the IC card through the transaction device 200 after that (step 1030). The thus down-loaded transaction monitoring program 350 executes the steps 1030 to 1170 which will be described below. That is, the transaction monitoring program 350 monitors the user's electronic commerce through the transaction device 200, so that it acquires the address of an accessed business connection coincident with the content (a business connection as a condition for providing insurance information) registered in the monitored address table 340 and an amount of money in the transaction between the transaction device 200 and the accessed business connection. Incidentally, the address of the business connection is acquired in the timing in which the address displayed in the browser 255 is coincident with the content of the monitored address table 340, and the amount of money in the transaction is acquired in the timing in which the settlement occurs in the scence.

Figure 14:
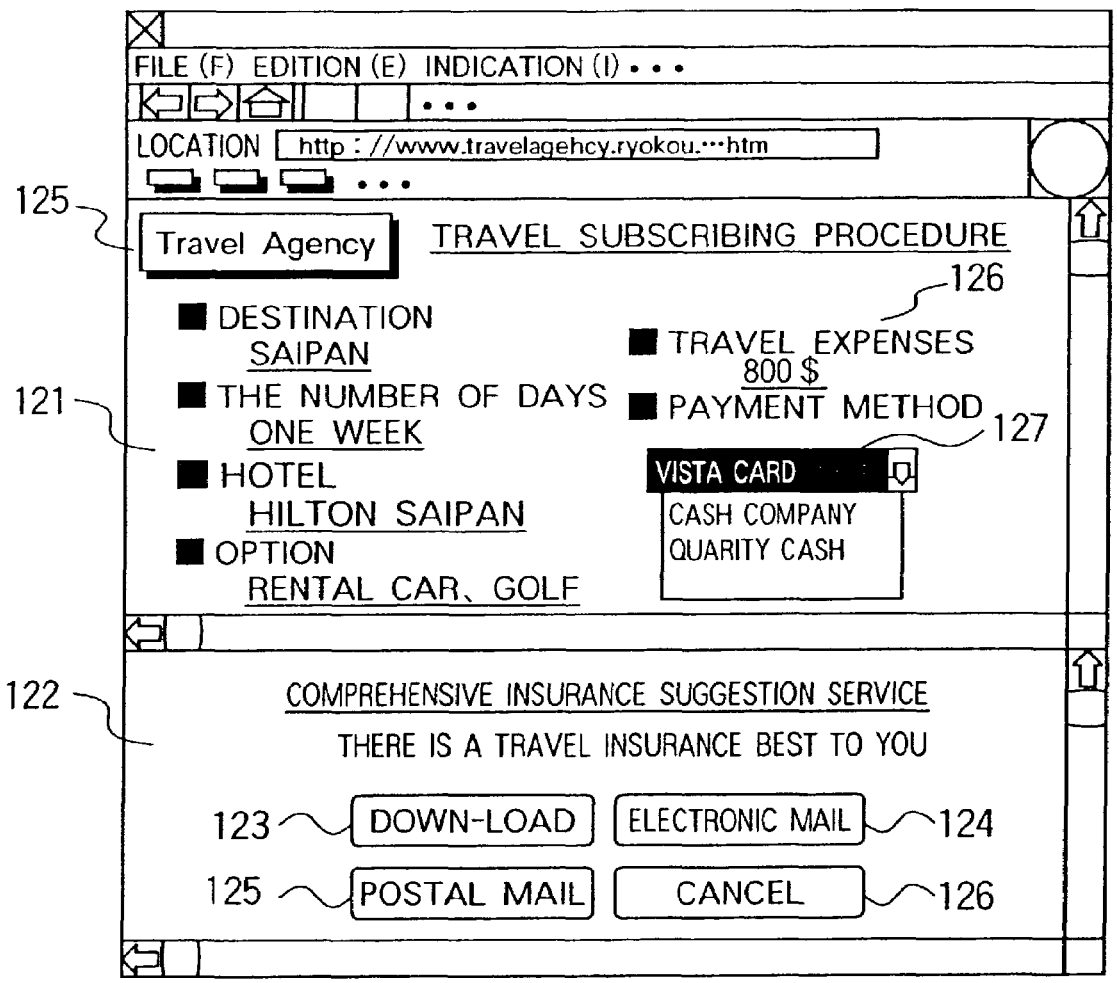
FIG. 14 is a scence configuration view showing an example of display of an insurance explanation request scence displayed on a display unit.

FIG. 14 shows an example of a transaction scence displayed on the display unit 240 of the transaction device 200 in the commercial transaction which will be performed after that. The address (information) of a business connection (a travel agency in this embodiment) accessed currently is indicated in a place column 125. That is, when a transaction is made between the transaction device 200 and a business connection server (a travel agency server in this embodiment) 400, the address of the business connection server 400 which sends a scence to the user is displayed in the place column 125 on the scence of the transaction device 200. In step 1030, the address displayed in the place column 125 is acquired by the transaction monitoring program 350.

Then, the control unit 230 collates the business connection address acquired by the transaction monitoring program 350 down-loaded in the step 1030 with the content of the monitored address table 340 down-loaded in the step 1030 (step 1040). If the result of the collation proves incoincidence between the business connection address and the address registered in the monitored address column 92 (FIG. 8) of the monitored address table 340, the situation of the procedure goes back to the step 1030 to monitor the business connection address.

If the result of the collation in the step 1040 proves coincidence between the business connection address and the address registered in the monitored address column 92 of the monitored address table 340, the control unit 230 acquires the address No. (corresponding to a business connection under a transaction) from an address No. column 91 (FIG. 8) correspondingly to the address. In the advertisement condition column 104 (FIG. 9) of the insurance advertisement condition table 360 down-loaded, entries corresponding to the thus acquired address No. are examined so that information "commodity No., address No." indicating the flagged positions in the row is delivered to the IC card 100. The control unit 110 of the IC card 100 adds 1 to a position corresponding to the business connection address history storage portion 140 in the IC card 100 as the history of the access destination. For example, in the display scence shown in FIG. 14, the address displayed in the place column 125 coincides with the address set in the monitored address column 92 in the record 93 (FIG. 8) on the monitored address table 340. Accordingly, the control unit 230 retrieves the address No. "c" corresponding to the coincident address in the address No. column 91 from the advertisement condition column 104 (FIG. 9) on the insurance advertisement condition table 360 and delivers "7, c" and "8, c" indicating positions corresponding to the records 105 and 106 flagged in the row 106 to the control unit 110. The control unit 110 adds "1" to corresponding positions of the access history column 113 of the business connection address history storage portion 140 (FIG. 10) indicated by this information (step 1050). Accordingly, information concerning the transaction (log information) contains information in the access history column 113.

Then, the control unit 230 checks whether settlement occurs between the user and the business connection or not (step 1060). The determination as to whether settlement occurs between the user and the business connection or not, is based on the detection of occurrence of access concerning reference, copying, addition/subtraction, etc. with respect to the business connection sending information 135 regarded as monetary features related to the settlement methods managed by the settlement transaction account storage portion 120 in the IC card 100. In response to occurrence of a settlement, the control unit 230 controls the down-loaded transaction monitoring program 340 to acquire the amount of money occurring in the transaction on the scence. The thus acquired information concerning the amount of money in the transaction is delivered to the control unit 110 through the card reader/writer 210. The control unit 110 accumulates the amount of memory in the spent money column 133 in the record in which a corresponding settlement method is registered in the settlement method column 132 (FIG. 11) of the settlement transaction account storage portion 120. When, for example, the user selects "VISTA CARD" which is a credit card in a payment method column 127 on the display scence shown in FIG. 14 so that information (here, card number) regarded as a monetary symbol is sent to the business connection, the control unit 230 under the control of the transaction monitoring program 340 acquires travel cost information 126 on the scence and delivers the information to the IC card 100. The control unit 110 accumulates the travel cost indicated by the travel cost information into the spent money column 133 in the record 134 on the settlement transaction account storage portion 120 (step 1070). Accordingly, information concerning the transaction further contains information concerning the amount of money in the transaction between the user and the business connection, and information concerning the settlement method used in the transaction.

Then, the control unit 230 delivers the commodity No. (FIG. 10) set in the commodity No. column in the record including flagged positions acquired in the step 1050 and condition information set in the advertisement condition column 104 (FIG. 9) to the control unit 110. The control unit 110 collates the received condition information 104 with the information accumulated in the advertisement condition column 113 (FIG. 10) in the corresponding record of the business connection address history storage portion 140. When, for example, the flagged positions acquired in the step 1050 are "7, c" and "8, c" (FIG. 10) with respect to the business connection "c", information (Nos. 7 and 8) in the commodity No. column 101 and information (in which "7, c", "8, c" and "8, d" are flagged) in the advertisement condition column 104 in the records 105 and 106 (FIG. 9) corresponding to the commodity Nos. 7 and 8 are delivered to the IC card 100. In the IC card 100, the control unit 110 acquires values (in which "7, c" and "8, c" are flagged) in the advertisement condition column 113 in the records 114 and 115 having the commodity Nos. coincident with the received commodity Nos. (Nos. 7 and 8 in this embodiment) in the commodity No. column 111 from the business connection address history storage portion 140 on the basis of the information and compares the value information with the received condition information (step 1080). If the result of the comparison proves incoincidence between the information in the advertisement condition column 104 delivered from the transaction device 200 to the IC card 100 and the information in the advertisement condition column 113, the situation of the procedure goes back to the step 1030 to monitor the business connection address. In FIGS. 9 and 10, the result with respect to the commodity No. 7 indicates coincidence but the result with respect to the commodity No. 8 indicates incoincidence.

If the result of the comparison in the step 1080 proves coincidence between the information in the column 104 and the information in the column 113 with respect to a certain commodity No., the control unit 110 delivers the commodity No. (for example, No. 7) in the commodity No. column 111 in the coincident record to the transaction device 200. The control unit 230 of the transaction device 200 down-loads an explanation request scence of an insurance class (for example, travel insurance) corresponding to the received commodity No. from the insurance suggestion scence 370 of the transaction monitoring program storage server 300 through the browser 255 and displays the scence on the display unit 240. The down-loaded scence is displayed on a part of the currently displayed scence. For example, as shown in FIG. 14, the display scence on the display unit 240 is divided so that the explanation request scence is displayed in a lower region 122, for example, in the lower side of the display scence 121 down-loaded from the business connection server accessed in the step 1030. A button for performing selection inputting as to whether the explanation of the commodity concerning the content of the insurance of the corresponding insurance class (in FIG. 14, travel insurance) is accepted or not, is provided in the explanation request scence. As buttons for requesting explanation, there are a button 123 for down-loading information immediately to accept explanation, a button 124 for accepting information by another method such as electronic mail, a button 125 for accepting information by mail, and so on. The button 123 for down-loading explanation is linked to a commodity content explanation address which is an address of a home page in which the commodity of the insurance class is explained. Further, a cancel button 126 is selected when the user rejects the acceptance of the explanation (step 1090).

When the user performs a selecting operation on the explanation request scence, that is, when the user selects any one of the buttons 123 to 126 on the explanation request scence, the control unit 230 checks whether the button selected by the user is to request explanation or not (step 1100). If the selected button is any one of the buttons 123 to 125 for requesting explanation, a further determination is made as to whether the selected button is the down-load button 123 or not (step 1110).

If the selected button is the down-load button 123, the control unit 230 down-loads a commodity content explanation scence corresponding to the commodity content explanation address linked to the down-load button 123 from the business connection scence held in the storage unit 430 of the business connection server 400 disposed in an insurance company, or the like. In this occasion, the control unit 110 delivers information (information in the spent money column 133) indicating the amount of spent money in every settlement No. in the column 131 to the control unit 230 making reference to the settlement transaction account storage portion 120 (FIG. 11) in the IC card 100. The control unit 230 examines which category in the settlement No. column 153 on the commodity scence display condition table 370 (FIG. 12) down-loaded contains the amount of spent money on the basis of the received information to thereby acquire a record largest in the number of satisfied conditions. Then, recommended commodity information (type) set in the recommended commodity column 152 in the thus acquired record is acquired, so that the commodity explanation scence is displayed on the display unit 240 while display information corresponding to the recommended commodity can be discriminated from other commodity information.

Figure 15:
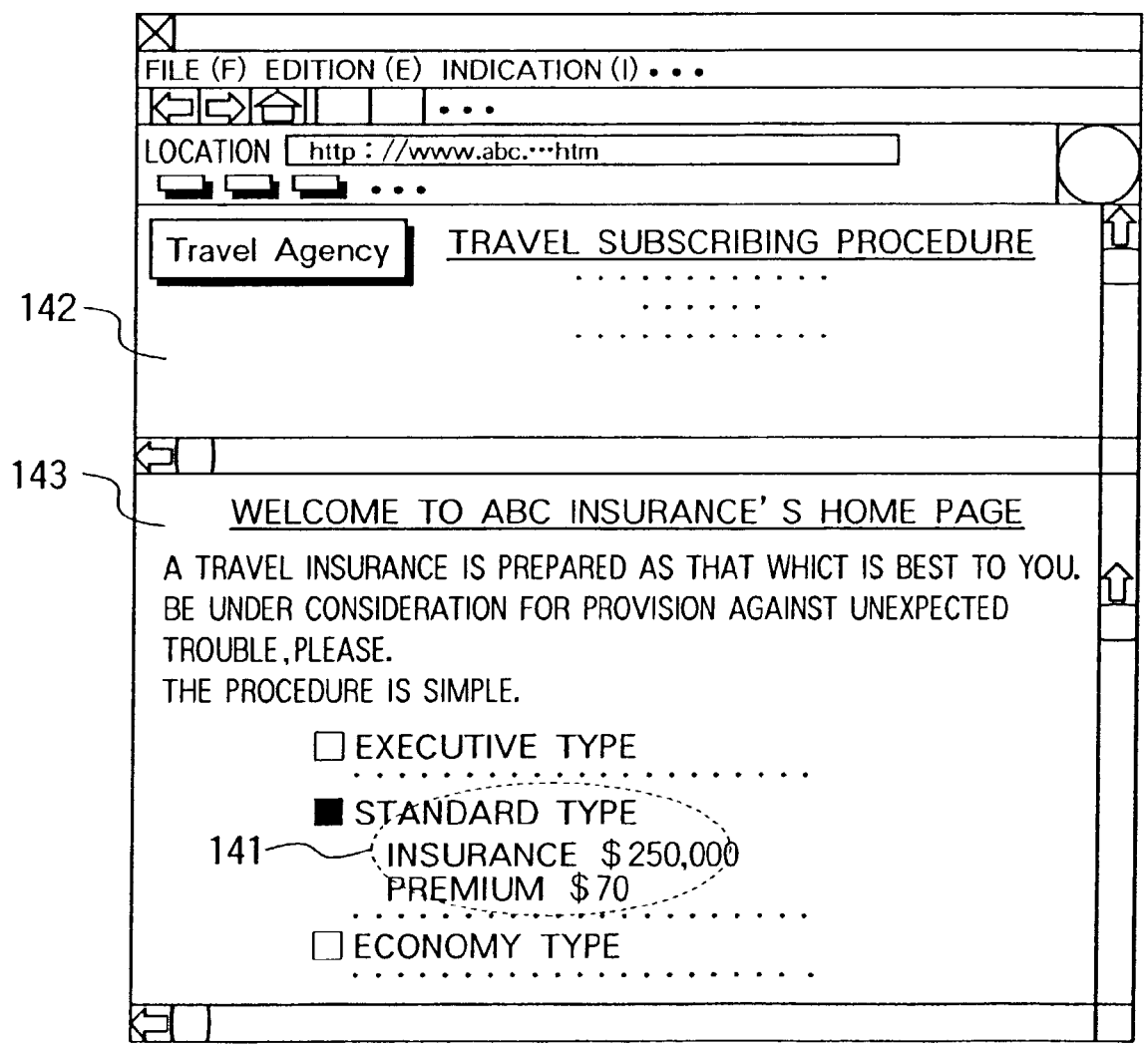
FIG. 15 is a scence configuration view showing an example of display of an insurance explanation scence displayed on a display unit.

When, for example, the user selects the down-load button 123 on the explanation request scence, the control unit 230 down-loads a commodity content explanation scence corresponding to the commodity content explanation address 103 "http://www.ABC . . . htm" corresponding to travel insurance in the record 105 on the insurance advertisement condition table 360 (FIG. 9) from the business connection scence information held in the storage unit 430 of the business connection server 400. In this occasion, the control unit 110 of the IC card 100 delivers, for example, (settlement No., the amount of spent money in a term of from the present to the past one month)=(1, 0.8), (2, 1.7), (3, 1.3), (4, 0.0), (5, 9.5) . . . to the control unit 230 of the transaction device 200 making reference to the settlement transaction account storage portion 120 (FIG. 11). From the commodity scence display condition table 370 (FIG. 12) and on the basis of the received information, the control unit 230 makes a conclusion that the record largest in the number of satisfied conditions is, for example, the record 154. Accordingly, the control unit 230 determines "standard" as the recommended commodity. Further, the explanation portion 141 concerning "standard" on the commodity explanation scence 143 shown in FIG. 15 is displayed on the display unit 240 so as to be emphasized to be discriminated from other explanations. The display scence on the display unit 240 is divided so that the commodity explanation scence 143 is displayed in a region in the lower side of the "travel subscribing procedure scence" 142 which has been opened already (step 1120).

If a decision is made in the step 1110 that the button 124 or 125 for requesting the acceptance of information by another method is selected, the control unit 230 receives an electronic mail address or a mail address corresponding to the type of the pushed button from the control unit 110 of the IC card 100 and sends the information to the business connection server (for example, server 401) disposed in an insurance company, or the like, through the browser 255. Here, the control unit 110 of the IC card 100 acquires the amount of spent money corresponding to each settlement No. registered in the settlement transaction account storage portion 120 in order to deliver the electronic mail address or mail address to the control unit 230 and acquires information such as a mail address, an electronic mail address, or the like, corresponding to the type of the pushed button from information held in the personal information storage portion 160 (step 1130).

The business connection server (server 401) disposed in an insurance company, or the like, determines the recommended commodity 152 from the received information in the same manner as in the step 1120. Consequently, the server disposed in the insurance company, or the like, sends commodity explanation information based on the recommended commodity 152 to the transaction device 200 through the network in accordance with the requested means (step 1140).

If the cancel button 126 is selected in the step 1100, the control unit 230 notifies the selection to the control unit 110 of the IC card 100. Upon reception of the notification, the control unit 110 adds 1 (one) to the advertisement reject count column 112 corresponding to the commodity No. column 111 in which the corresponding commodity No. in the business connection address history storage portion 140 (FIG. 10) is registered (step 1150). Succeedingly, the control unit 110 examines whether the value in the advertisement reject count column 112 reaches a predetermined value or not (step 1160). If the result of the examination indicates that the value reaches the predetermined value, the history information in the record is erased and the situation of the procedure goes back to the step 1030 again to monitor the transaction (step 1170). If the value in the step 1160 does not reach the predetermined value, the situation of the procedure goes back directly to the step 1030 to monitor the transaction.

In the application program for monitoring the user's transaction, monitoring of the transaction is terminated in response to the closing of the browser 255.

In the aforementioned embodiment, the program in the control unit 230 in each of the transaction devices 200–20*m* for carrying out the procedure of FIG. 13 may be stored in the storage unit 330 of the transaction monitoring program storage server 300 so as to be downloaded through the network 500. Similarly, also the transaction device determination program 130 in each IC card 100 may be stored in the storage unit 330 of the transaction monitoring program storage server 300 so as to be down-loaded to the storage unit in each of the transaction devices 200–20m through the network 500 and further down-loaded from the storage unit to the IC card 100.

In this case, the program in the control unit 230 in each of the transaction devices 200–20m for carrying out the procedure of FIG. 13 and the transaction device determination program 130 in each IC card 100 may be recorded in a recording medium such as CD-ROM, or the like, in advance so that, after the recording medium is mounted on a recording medium drive unit 600 such as a CD-ROM drive unit, or the like, as shown in FIG. 1, the drive unit 600 is connected to the server 300 to down-load the programs to the storage unit 330.

Similarly, also the tables 340, 360 and 370, the program 350 and the scence information 380 and 390 in the storage unit 330 of the transaction monitoring program storage server 300 may be recorded in a recording medium such as CD-ROM, or the like, in advance so that, after the recording medium is mounted on a recording medium drive unit 600 such as a CR-ROM drive unit, or the like, the drive unit 600 is connected to the server 300 to down-load the programs to the storage unit 330.

Further, various types of information and programs in the storage unit 330 of the transaction monitoring program storage server 300 may be sent from a terminal, or the like, connected to the network 500 to the storage unit 330 through the network 500 so as to be downloaded to the storage unit 330.

Although the aforementioned embodiment has been described about the case where the IC card 100 is inserted in the card reader/writer 210, the same function as described above can be achieved also in the case where a non-contact IC card, or the like, is used. Although the above description has been made about the case where the application program necessary for monitoring transactions, the log information, etc. are stored in the transaction monitoring program storage server 300 and the IC card 100 so as to be processed under the control of the control unit 230 of the transaction device 200, it is a matter of course that these configurations may be changed optionally within the scope intended by the present invention. For example, processing in the aforementioned embodiment may be performed under the control of the control unit 320 of the server 300.

Although the above description has been made about the case where the commodity to be suggested is an insurance commodity, the present invention may be applied to the case where the commodity to be suggested is another commodity.

According to the present invention, log information, or the like, concerning electronic commerce is concentratedly collected into an IC card possessed by a customer per se. Accordingly, the customer per se can acquire commodity information in suitable timing.

Further, information concerning transactions, such as log information concerning electronic commerce on a network, or the like, is collected not into a server such as a business connection server, or the like, but into a portable information recording medium possessed by a user per se. Accordingly, even in the case where the user makes commercial transactions between a plurality of business connection servers, to which the log information is not shared, and a transaction device, suitable information concerning commodities and services can be provided to the user in suitable timing on the basis of the log information, or the like, in these commercial transactions with a plurality of business connection servers.

In addition, information concerning the privacy of the user, such as log information concerning electronic commerce on a network, or the like, can be prevented from leaking.

What is claimed is:

1. An access managing method in an apparatus coupled to a plurality of contents servers through a network, comprising the steps of:

specifying, in response to insertion of an IC card into a first unit of said apparatus, a predetermined contents servers of said plurality of contents servers which corresponds to the IC card;

monitoring, by a second unit of said apparatus, whether or not an access is made to the predetermined contents server, and updating, by said second unit, history of the access to the predetermined contents server when the access is made to the predetermined contents server;

recording, by a third unit of said apparatus in the IC card a transaction amount settled or spent in an electronic commerce transaction and a settlement method used for the transaction; and retrieving, by a fourth unit of said apparatus, goods information relating to goods that may be more suitable for purchase by the user of the IC card based on a combination of the transaction amount and the settlement method used for the transaction recorded in the IC card and providing, by said fourth unit, the goods information thus retrieved to permit purchase of the goods identified by the goods information by the user of the IC card.

2. A method of providing information by a system including a business connection server and a transaction device connected to each other by a network, comprising the steps of:

detecting, by the transaction device, an address of a business connection accessed by a customer in an electronic commerce transaction and determining whether or not the detected address of the business connection is a pre-selected address;

updating, by the transaction device, a number of accesses to the business connection accessed by the customer when the detected address of the business connection is the pre-selected address;

providing, by the business connection server, information concerning the business connection to the customer when the number of accesses to the business connection reaches a predetermined number;

recoding, by the transaction device, in an IC card a transaction amount settled or spent in the electronic commerce transaction and a settlement method used for the transaction; and retrieving, by the transaction device, goods information relating to goods that may be more suitable for purchase by the user of the IC card based on a combination of the transaction amount and the settlement method used for the transaction recorded in the IC card and providing the goods information thus retrieved to permit purchase of the goods identified by the goods information by the user of the IC card.

3. An information providing method, in an electronic commerce system including a transaction device and a business connection server for performing a transaction between the business connection server and the transaction device through a network, for providing information concerning a commodity related to the transaction to a user operating the transaction device, the method comprising the steps of:

accepting, by the transaction device, a portable information recording medium of a user of the transaction device;

obtaining, from the portable information recording medium, by the transaction device, information concerning a business connection in a transaction performed by the transaction device;

obtaining, by the transaction device history of information concerning a transaction performed between the transaction device and the business connection;

determining whether or not the transaction history satisfies a predetermined condition, and providing, by the transaction device, information concerning a commodity related to the transaction when the transaction history satisfies the predetermine condition;

recording, by the transaction device, in an IC card a transaction amount settled or spent in an electronic commerce transaction and a settlement method used for the transaction; and retrieving, by the transaction device, goods information relating to goods that may be more suitable for purchase by the user of the IC card based on a combination of the transaction amount and the settlement method used for the transaction recorded in the IC card and providing the goods information thus retrieved to permit purchase of the goods identified by the goods information by the user of the IC card.

4. A method of providing information, comprising the steps of:

showing, to a user operating a transaction device coupled to a server through a network, first information provided by the server on a first screen, of a display of the transaction device, in an electronic commerce transaction;

showing to the user a second screen, on the display of the transaction device, in order to provide second information on the first screen when a number of times the first screen is shown to the user reaches a predetermined number in a case where the second information related to the first information is managed by the transaction device;

recording, by the transaction device, in an IC card a transaction amount settled or spend in the electronic commerce transaction and a settlement method used for the transaction; and retrieving, by the transaction device, goods information relating to goods that may be more suitable for purchase by the user of the IC card based on a combination of the transaction amount and the settlement method used for the transaction recorded in the IC card and providing the goods information thus retrieved to permit purchase of the goods identified by the goods information by the user of the IC card.

5. An electronic commerce method in a transaction device coupled to a plurality of business connection servers through a network, said method comprising the steps of:

(a) monitoring, by the transaction device, whether a transaction has been performed on a particular one of said business connection servers;

(b) when the transaction has been performed on a particular one of said business connection servers, updating, by the transaction device, transaction information relating to the particular one of said business transaction servers within an IC card;

(c) obtaining, by the transaction device, an address of one of said plurality of business connection servers from said IC card;

(d) performing, by the transaction device, electronic commerce with said one of said plurality of business connection servers by using the address obtained in said step (c);

recording, by the transaction device, in the IC card a transaction amount settled or spent in the electronic commerce transaction and a settlement method, used for the transaction; and retrieving, by the transaction device, goods information relating to goods that may be more suitable for purchase by the user of the IC card based on a combination of the transaction amount and the settlement method used for the transaction recorded in the IC card and providing, by the transaction device, the goods information thus retrieved to permit purchase of the goods identified by the goods information by the user of the IC card.

6. An electronic commerce method according to claim 5, wherein said step (c) obtains an URL address of said one of said plurality of business connection servers as said address of said one of said plurality of business connection servers.

7. A transaction device coupled to a plurality of business connection servers through a network for performing electronic commerce, comprising:

a unit which monitors whether a transaction has been performed on a particular one of said business connection servers;

a unit which when the transaction has been performed on a particular one of said business connection server, updates transaction information relating to the particular one of said business transaction servers within an IC card;

a unit which obtains an address of one of said plurality of business connection servers from said IC card;

a unit which performs electronic commerce with said one of said plurality of business connection servers by using the address thus obtained;

wherein said unit which updates transaction information also records in the IC card a transaction amount settled or spent in the electronic commerce transaction and a settlement method used for the transaction; and a unit which retrieves goods information relating to goods that may be more suitable for purchase by the user of the IC card based on a combination of the transaction amount and the settlement method used for the transaction in the IC card and providing the goods information thus retrieved to permit purchase of the goods identified by the goods information by the user of the IC card.

8. A transaction device according to claim 7, wherein said address is a URL address of said one of said plurality of business connection servers.

* * * * *